(12) United States Patent
Kim

(10) Patent No.: US 7,839,121 B2
(45) Date of Patent: Nov. 23, 2010

(54) APPARATUS AND METHOD FOR MANAGING POWER OF BATTERY PACKS IN A PORTABLE DEVICE

(75) Inventor: Yang Hoon Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 823 days.

(21) Appl. No.: 11/687,423

(22) Filed: Mar. 16, 2007

(65) Prior Publication Data

US 2007/0216355 A1    Sep. 20, 2007

(30) Foreign Application Priority Data

Mar. 20, 2006    (KR) ...................... 10-2006-0025411
Feb. 13, 2007    (KR) ...................... 10-2007-0014949

(51) Int. Cl.
*H02J 7/00* (2006.01)
(52) U.S. Cl. ...................................... 320/124; 320/125
(58) Field of Classification Search ......... 320/124–125, 320/128
See application file for complete search history.

(56) References Cited

U.S. PATENT DOCUMENTS

| 4,315,162 | A | * | 2/1982 | Ferguson | ..................... 307/66 |
| 4,737,702 | A |   | 4/1988 | Koenck |   |
| 4,849,682 | A |   | 7/1989 | Bauer et al. |   |
| 5,583,440 | A | * | 12/1996 | Bisher | ......................... 324/426 |
| 5,874,823 | A | * | 2/1999 | Suzuki | ....................... 320/125 |
| 5,955,867 | A | * | 9/1999 | Cummings et al. | .......... 320/107 |
| 6,160,377 | A |   | 12/2000 | Fujii |   |

\* cited by examiner

*Primary Examiner*—Edward Tso
*Assistant Examiner*—Samuel Berhanu
(74) *Attorney, Agent, or Firm*—Fish & Richardson P.C.

(57) ABSTRACT

To manage power of battery packs, charging currents and remaining capacities of the battery packs may be detected. An order for charging and discharging the battery packs may be determined based on the charging currents. The battery packs may be charged or discharged in the determined order based on whether an external voltage is detected. The battery packs may be charged using charging voltages with associated currents corresponding to the detected charging currents.

20 Claims, 4 Drawing Sheets

FIG. 4

| Classification | Capacity per cell | Charging current per cell | Number of cells | Charging current | Used capacity | Remaining capacity ratio |
|---|---|---|---|---|---|---|
| First battery | 2000mA | 100mA | 6 | 600mA | 3000mA | 75% |
| Second battery | 2000mA | 100mA | 3 | 300mA | 3000mA | 100% |

APPARATUS AND METHOD FOR MANAGING POWER OF BATTERY PACKS IN A PORTABLE DEVICE

BACKGROUND

1. Field

The present invention relates to an apparatus and method for managing battery power in a portable device having at least one battery pack mounted therein, and more particularly, to an apparatus and method for managing power of battery packs in a portable device, in which the charging and discharging order is selectively controlled according to a value of a charging current of each battery pack electrically connected to the portable device thus to increase the power use efficiency of the battery packs.

2. Description of Related Art

With the development of electro-communication technology, devices such as personal computers (hereinafter, referred to as "PCs") have been made portable. For example, portable electronic devices, such as notebook PCs, personal digital assistants (PDAs), have a small size or lightweight in consideration of mobile environments, i.e., portability for use in outdoor places.

A notebook PC is characterized in a "battery driving type," that is, the notebook PC is driven by a built-in battery as well as by a commercial AC power source using an AC adaptor. This allows the notebook PC to be used at places such as outdoor places and business trip places where the commercial AC power source is unavailable. In general, the built-in battery is in the form of a battery pack having a plurality of battery cells packaged. A typical battery cell is a rechargeable cell, such as a Li-Ion or NiMH cell.

A battery built in or coupled to a notebook PC has a limited capacity. The duration of a once fully charged battery depends on the number of cells and a system specification but is only about 3 to 4 hours. Accordingly, researches have been studied to extend the duration of a portable device by a battery.

A so-called "power management" related technique is the best example for extension of battery duration. It is known that the duration can be extended by increasing the number of cells in a battery pack or using a cell having high energy density such as a lithium-ion cell. However, if the number of the cells in the battery pack is increased, the weight and size of the battery pack is also relatively increased, which does not allow the number of the cells in the battery pack to be only increased.

In recent years, a notebook PC of a "dual battery" type in which two battery packs can be built in or coupled to the notebook PC has been developed and manufactured. For example, a computer system of a dual battery type is disclosed in Japanese Patent Laid-open Publication No. HEI 8-54967 filed by "International Business Machines Cooperation." Further, a notebook PC "TX4210K" in the "XNOTE TX series" (XNOTE is a trademark of LG Electronics Inc.) available from LG Electronics Inc. has a structure in which an optional battery pack is detachably coupled to a back plane of the computer.

In addition to the notebook PCs, launched are portable devices having a battery pack named as a subsidiary or optional battery, which is exchanged for a floppy disc drive (FDD), optical disk drive (ODD) or the like detachably coupled to the portable devices. A portable device having two battery packs has a doubled duration in comparison with a portable device having one battery pack. Of course, the duration depends on the number of optional batteries added to a portable device in addition to a basic battery pack.

A notebook PC having dual battery packs includes a power management unit for setting the discharging/charging order of basic and optional battery packs so as to efficiently manage the power from the dual battery packs. The power management unit of the notebook PC preferentially discharges the built-in or mounted optional battery pack to drive the computer and then discharges the basic battery pack when the optional battery pack is substantially almost discharged. When the battery packs are charged by the external power supplied via an AC adaptor, the power management unit of the notebook PC controls a computer system to charge the basic battery pack voltage earlier than the optional battery pack. When it is detected that the basic battery pack is fully charged, the power management unit controls the computer system to charge the optional battery pack voltage.

The charged optional battery pack is preferentially discharged and the basic battery pack is preferentially charged to enable the portable device to be driven by the built-in battery even when the optional battery is detached from the portable device since the optional battery is mounted as an external device to the portable device or coupled to the portable device in a place from which an FDD, an ODD, or the like is detached.

However, with the conventional method for managing power of the battery packs in the portable device of a dual battery type in which the charging and discharging order is set so that the optional battery pack is preferentially discharged and the basic battery pack is preferentially charged, it takes much time to charge the battery packs as the discharging and charging operation is performed in the predetermined order of the basic and optional battery packs irrespective of charge capacities of the battery packs.

A charging time of a general battery pack is known to be in proportion to a battery use ratio (a used capacity relative to a total capacity). For example, it can be discovered that in a general notebook PC, if two battery packs having different capacities are discharged and then charged under the same condition, a charging time of the battery having a smaller charging capacity is longer than that of the battery having a greater charging capacity. This is because a charge control circuit of the notebook PC supplies a voltage terminal of the battery pack with a charging voltage with a current capacity adjusted to a charging current of the battery pack.

In the notebook PC, the charge control circuit is designed to output a charging voltage with a relatively high current capacity, and adjusts a current capacity of a charging voltage supplied to the voltage terminal of the battery pack according to a charging current of the battery pack. For this operation, the charge control circuit of the notebook PC acquires information on the charging current capacity from the battery pack to be charged via a system management (SM) bus, and supplies the voltage terminal of the battery pack with the charging voltage corresponding to the charging current of the corresponding battery pack in order to charge the battery cell.

Accordingly, it can be seen that the charging time of the battery pack of the notebook PC is not in proportion to a discharged amount of the battery but is in proportion to a used capacity relative to a total capacity of the battery, i.e., a battery use ratio. When the capacity of the basic battery pack is greater than that of the optional battery pack, the conventional method for managing battery power of the notebook PC preferentially discharges the optional battery pack irrespective of a battery capacity. In this case, it takes much time to charge the battery pack in comparison with a case where a battery pack having a greater battery capacity is preferentially discharged and charged. When the capacity of the basic battery pack is smaller than that of the optional battery pack, the conventional method for managing battery power preferentially charges the basic battery pack having a smaller battery capacity, so that the same charging time is consumed but a charging effect lowers as compared with a case where a battery having a greater charging capacity is charged preferentially.

As described above, in the conventional method for controlling the charge and discharge of dual battery packs, according to the predetermined order irrespective of charging and discharging characteristics of the battery packs, the optional battery pack is discharged earlier than the basic battery pack, and the basic battery pack is charged earlier than the optional battery pack when an external AC power source is supplied. Accordingly, there is a problem in that it takes much time to charge the battery packs when the capacity of the optional battery is smaller than that of the basic battery.

SUMMARY

Accordingly, an object of the present invention is to provide an apparatus and method for managing power of battery packs in a portable device capable of receiving at least two battery packs, in which power use efficiency of the battery packs can be increased by automatically determining the discharging and charging order according to a charging capacity of the battery packs electrically connected to the portable device.

Another object of the present invention is to provide an apparatus and method for managing power of battery packs, in which identification numbers, remaining capacities, charging states, and charging currents of all the battery packs electrically connected to the portable device are detected according to whether an external AC power is applied, and the discharging and charging order of the battery packs is determined, thereby controlling the discharging and charging of the battery packs.

A further object of the present invention is to provide an apparatus and method for managing power of battery packs, in which charging currents of the battery packs electrically connected to the portable device are detected and a battery pack having a higher charging current is preferentially discharged and charged.

According to an aspect of the present invention for achieving the objects, there is provided an apparatus for managing power of battery packs in a portable device, comprising: first and second battery packs, each of the battery packs including cells charged and discharged via a voltage terminal and a cell watchdog (CEWD) for detecting a remaining capacity and a charging current of the cells and outputting the remaining capacity and the charging current in response to a battery state information request signal; a charging voltage generator for converting external voltage input via an external voltage input terminal into a charging voltage (CV) with a charging current corresponding to a charging control signal (CCS) and outputting the charging voltage; an external voltage detector (EVD) for generating an external voltage detection signal (EVDS) when an external voltage is input via the external voltage input terminal and it is detected; a charging/discharging control unit for outputting a charging mode signal in response to the external voltage detection signal and acquiring information on the remaining capacity and the charging current from the first and second battery packs to generate a battery selection signal (SEL) for charging or discharging the battery pack having a higher charging current and to generate the charging control signal corresponding to the remaining capacity and the charging current; and a charging/discharging path setting unit connected between an output terminal of the charging voltage generator, voltage terminals of the first and second battery packs and a power input terminal of a system load to supply the charging voltage output from the charging voltage generator to the first or second battery pack or supplying output voltage from the first or second battery pack to the system load in the portable device according to the charging mode signal and the selection signal.

The charging/discharging path setting unit may comprise first and second analog switches respectively connected between the output terminal of the charging voltage generator and the output terminals of the first and second battery packs and independently turned on according to the selection signal; and a third analog switch connected between a common connection node of the first and second analog switches and the system load and turned on or off according to the charging mode signal.

Preferably, the apparatus may further comprise a voltage path controller for supplying the external voltage to the system load only in one way direction, the voltage path controller being connected between the external voltage input terminal and an output node of the third analog switch.

The voltage path controller may comprise a diode.

Preferably, the apparatus further comprises a DC-DC converter for dropping and stabilizing the external voltage or a DC voltage supplied from the first and second battery packs to a voltage level suitable for driving the system load and distributing the resultant voltage to respective parts of the system load, the DC-DC converter being connected between the voltage path controller and the voltage input terminal of the system load of the portable device.

According to another aspect of the present invention, there is provided a method for managing power of battery packs in a portable device, comprising steps of: detecting remaining capacities and charging currents of all the battery packs electrically connected to the portable device; and determining charging/discharging order of the battery packs from the battery pack having a higher charging current of the detected charging currents to the battery pack having a lower charging current thereof, and charging or discharging the battery packs in the determined charging/discharging order according to whether the external voltage is supplied.

It is noted that the charging/discharging includes both charging and discharging.

According to a further aspect of the present invention, there is provided a method for managing power of dual battery packs, which is usefully applied to a portable device including at least two smart battery packs, each of the battery packs having cells charged and discharged and a CEWD for storing information on a total capacity of the cells and a charging current of the cells and battery state information including a remaining capacity obtained by measuring charge of the cells, the smart battery packs outputting the battery state information through data communication. The method comprises steps of: detecting the charging current of each battery pack through data communication with the battery packs; setting up charging/discharging order of the battery packs from the battery pack having a higher charging current of the detected charging currents to the battery pack having a lower charging current thereof; and charging or discharging the battery packs in the set charging/discharging order according to the supply of the external voltage.

As described above, with an apparatus and method for managing power of dual battery packs in a portable device according to the embodiment of the present invention, a total charging current of the cells in each of the first and second battery packs electrically connected to the portable device is detected, the charging/discharging order of the battery packs is set from the battery pack having a higher charging current of the detected charging currents to the battery pack having a lower charging current thereof, and the battery packs are charged or discharged in the set charging/discharging order according to whether the external voltage is supplied, thereby shortening the charging time of the battery packs and extending duration of the portable device by the battery voltage.

BRIEF DESCRIPTION OF THE DRAWINGS

The above and other objects, features and advantages of the present invention will become apparent from the following description of a preferred embodiment given in conjunction with the accompanying drawings, in which:

FIG. 4 is an information table of dual battery packs for illustrating the embodiment of the present invention, in which the table shows CEWD information of first and second battery packs shown in FIG. 1.

DETAILED DESCRIPTION

An apparatus and method for managing power of battery packs in a portable device will be described in detail with reference to the accompanying drawings.

Figure 1:
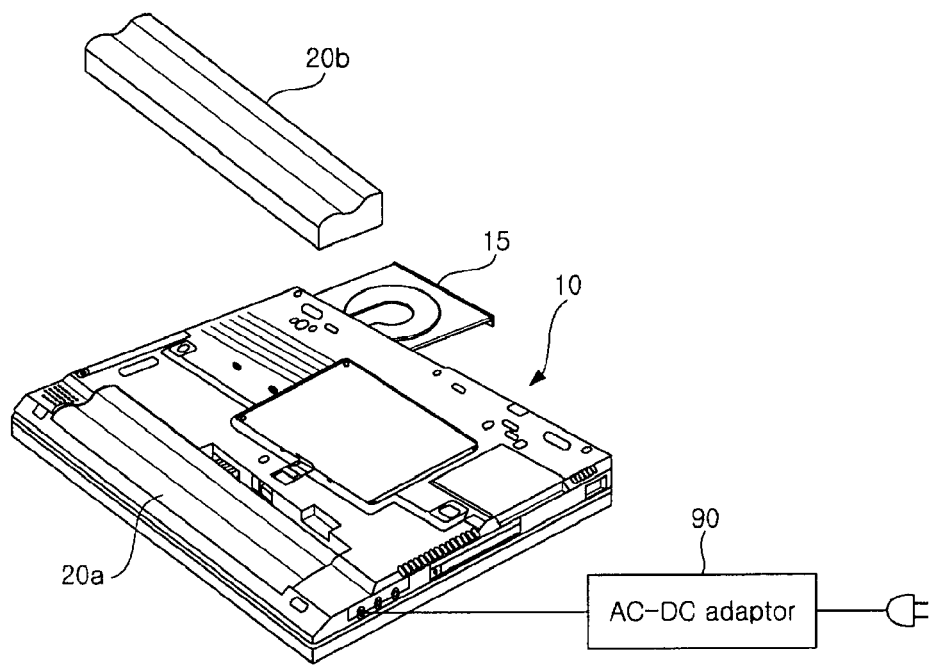
FIG. 1 is a rear view illustrating a portable device having a structure which makes it possible to mount dual batteries, in which an AC-DC adaptor is connected to the portable device.
Figure 2:
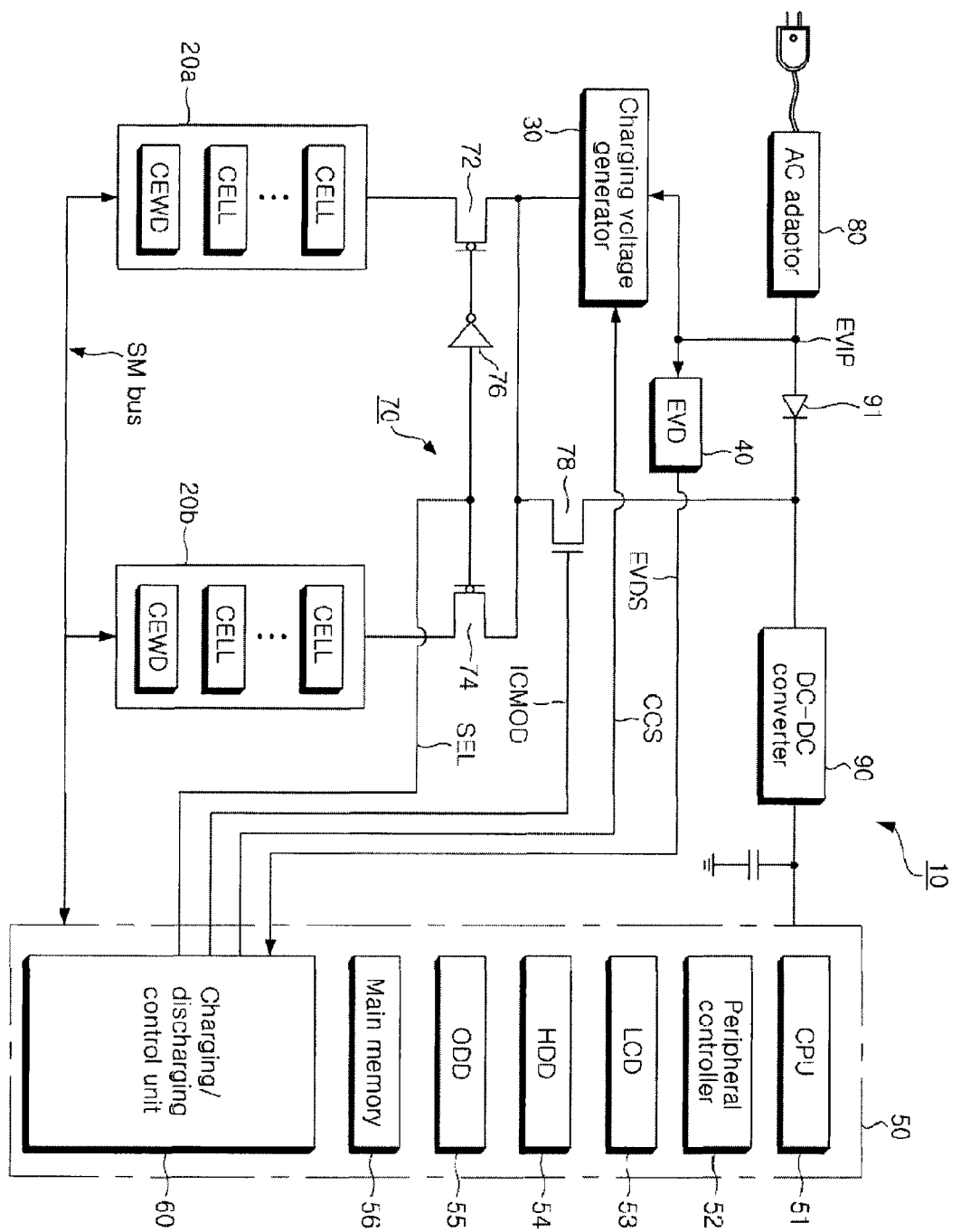
FIG. 2 is a block diagram illustrating an apparatus for managing power of battery packs of a portable device according to a preferred embodiment of the present invention.
Figure 3:
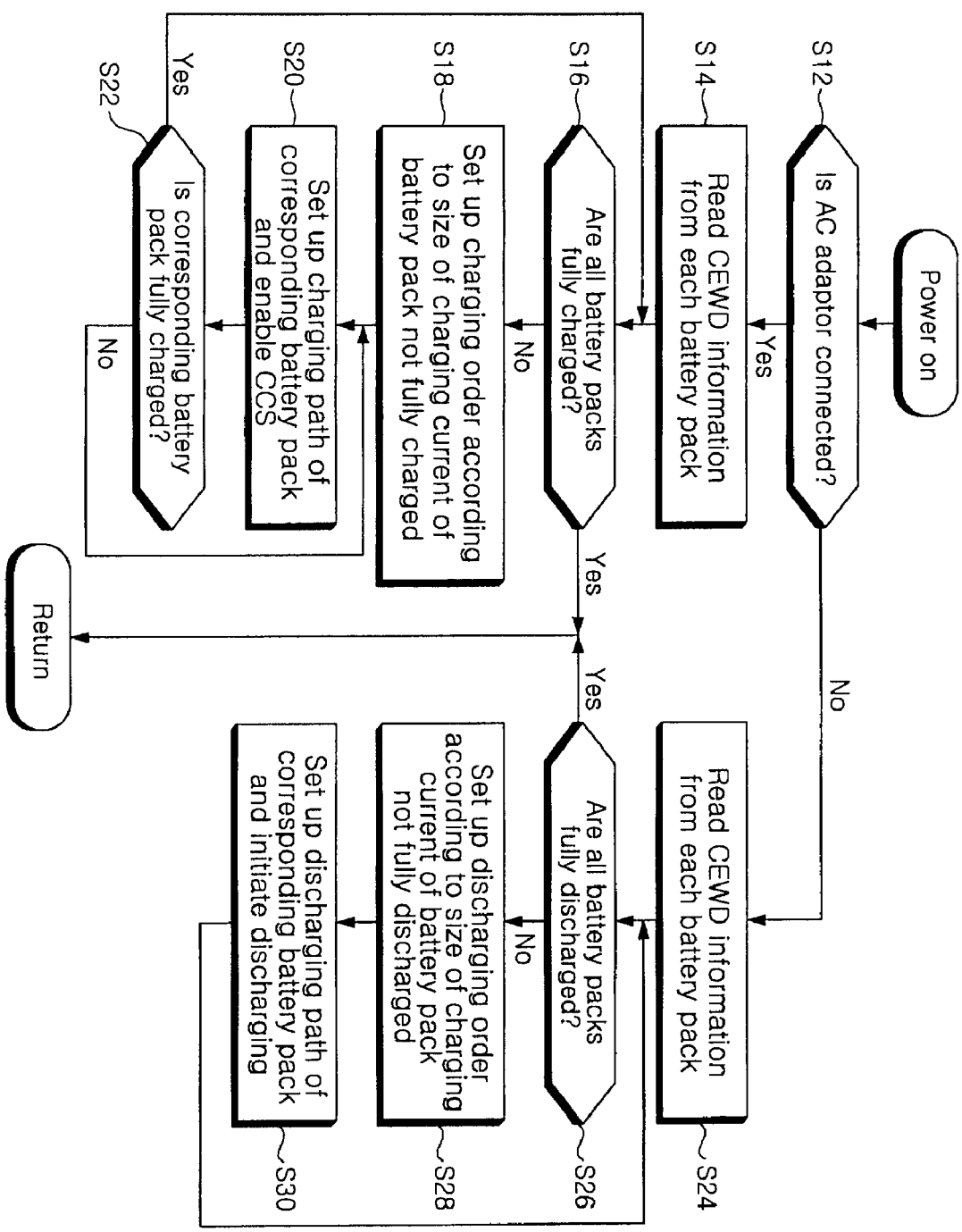
FIG. 3 is a flowchart illustrating the charging and discharging order of battery packs having different charging capacities according to the preferred embodiment of the present invention, in which an operation program sequence of a control unit of FIG. 1 is shown.

FIG. 1 illustrates a back plane of a portable device 10 having two or more battery packs electrically connected thereto. FIG. 2 is a block diagram illustrating an apparatus for managing power of battery packs of a portable device according to a preferred embodiment of the present invention. FIG. 3 is a flowchart illustrating the charging and discharging order of battery packs having different charging capacities according to the preferred embodiment of the present invention. FIG. 4 shows an information table of dual battery packs for illustrating the embodiment of the present invention, including a capacity per cell, and a charging current per cell, the number of cells, a total charging current of a battery pack, a used capacity, and a remaining capacity of a first battery pack 20a and a second battery pack 20b shown in FIG. 1. The first battery pack 20a means a basic battery pack basically mounted in the portable device 10, and the second battery pack 20b means an optional battery pack or subsidiary battery pack with which the portable device 10 is optionally provided.

Although the second battery pack 20b is shown in FIG. 1 as being mounted to the outside of the first battery pack 20a, it is noted that the second battery pack 20b may be mounted in a space from which an ODD 15 is detached or may be coupled via an FDD or a docking connector.

As shown in FIG. 1, the portable device 10, e.g., a notebook PC includes two battery packs 20a and 20b as a power source in addition to an AC power source. Each of the first and second battery packs 20a and 20b includes a number of cells, and a cell watchdog (CEWD), in which a register stores information on a chargeable capacity per cell, a charging current per cell, the number of the cells and a total charging current and a total remaining capacity of all the cells is detected and stored in the register. The battery packs 20a and 20b are also named as smart batteries. The battery packs 20a and 20b are connected to the SM bus of the portable device 10, and send the information together with their identification numbers to the corresponding controller in response to a battery state information request signal input via the SM bus.

The AC power of the portable device 10 is converted into DC power by an AC adaptor 80 and then input to a diode 91 connected to an external voltage input terminal (EVIP). The diode 91 is to prevent backward voltage and current, i.e., prevent an internal battery voltage from being applied backward. The external voltage is input to a DC-DC converter 90 in the portable device 10 via the cathode of the diode 91 in a one way direction. Further, the output terminals of the first and second battery packs 20a and 20b are connected to the DC-DC converter 90 in parallel together with the output of the AC adaptor 80. The AC adaptor 80 is detachable from a body of the portable device 10, and the first and second battery packs 20a and 20b are also detachable from the body of the portable device 10 and may be exchanged.

The DC-DC converter 90 drops the DC voltage supplied by the AC adaptor 80 or the first and second battery packs 20a and 20b to a voltage level suitable for driving a system load 50 of the portable device 10, stabilizes the voltage, and distributes the voltage to respective parts of the system load. Here, the load includes a CPU 51 or a peripheral controller chip 52, a liquid crystal display (LCD)/backlight unit 53, a hard disk drive (HDD) 54, an optical disk drive (ODD) 55, a main memory 56, and a charging/discharging control unit 60.

The CPU 51 is a main controller for controlling the entire operation of the portable device 10 under the control of an operating system (OS). The main memory 56 is a memory unit used for loading each program or used as a work area of the CPU 51. The peripheral controller 52 includes a video controller for displaying an image on the display 53, and a number of chips for controlling the input and output of serial/parallel data. The HDD 54 and the ODD 55 are external storage units. The charging/discharging control unit 60 includes a control logic for controlling the charge and discharge of the first and second battery packs 20a and 20b. The charging/discharging control unit 60 is connected to the SM bus in order to transmit and receive data to and from the first and second battery packs 20a and 20b. The charging/discharging control unit 60 has a terminal for receiving the external voltage detection signal EVDS output from the EVD 40 in response to detection of the external voltage from the AC adaptor 80, and three output terminals for controlling charging/discharging mode and order of the first and second battery packs 20a and 20b.

In the embodiment of the present invention, the EVD 40 has been shown as being connected between the external voltage input terminal and the charging/discharging control unit 60. However, it is noted that the same operation is led even though the anode of the diode 91 is directly connected to the input terminal of the charging/discharging control unit 60 and then occurrence or not of the output from the AC adaptor 80 is directly detected by the charging/discharging control unit 50.

First and second analog switches 72 and 74, each of which includes a P-channel FET, are connected in serial to the output lines of the first and second battery packs 20a and 20b, respectively. An output terminal of an inverter 76 is connected to a gate of the first analog switch 72. A gate of the first analog switch 74 and an input terminal of the inverter 76 are connected to a selection signal (SEL) output terminal of the charging/discharging control unit 60. Further, a common connection node of the first and second analog switches 72 and 74 is connected to a charging voltage (CV) output terminal of the charging voltage generator 30, which adjusts and outputs the current-voltage of the output voltage of the AC adaptor 80 according to a charging control signal CCS of the charging/discharging control unit 60. A third analog switch 78 including an N-channel FET, which is switched by a charging mode signal (ICMOD) for setting the charging/discharging mode, is connected between the common connection node and the DC-DC converter 90. Here, the first, second and third analog switches 72, 74 and 78 are switched in response to the selection signal SEL and the charging mode signal (ICMOD), so that the charging/discharging mode and path of the first and second battery packs 20a and 20b is set up.

Preferably, a capacitor having a relatively large capacity is connected in parallel to the internal output node of the DC-DC converter 90 positioned in the portable device 10, so that the portable device 10 operates stably even when switching occurs in a moment from the first battery pack 20a to the second battery pack 20b.

Further, in the portable device 10, such as a notebook PC, shown in FIG. 2, the charging/discharging control unit 60 is set up to output the selection signal SEL and the charging mode signal (ICMOD) in a logic "high" state so that the driving voltage of the first battery 20a is supplied to the DC-DC converter 90 via the first and third analog switches 72 and 78 when a power switch (not shown) is turned on in a state where the AC adaptor 80 is not connected.

Charging Mode of Battery Pack

When the two batteries, i.e., the first battery 20a and the second battery 20b are electrically connected to the portable device 10 as shown in FIG. 2 and the portable device 10 is turned on by a user, the charging/discharging control unit 60 of FIG. 2 detects a level of an external voltage detection signal EVDS output from the EVD 40 in step S12 of FIG. 3 to check whether the AC adaptor 80 is connected to the external voltage input terminal EVIP of the portable device 10.

Assuming that the AC adaptor 80 is connected to the external voltage input terminal EVIP, the DC voltage output from the AC adaptor 80 is applied to the anode of the diode 91, the EVD 40 and the charging voltage generator 30. The EVD 40 detects a voltage of the external voltage input terminal EVIP and outputs an external voltage detection signal EVDS in a logic "high" state, and the charging/discharging control unit 60, which detects that the external voltage detection signal EVDS is enabled to a logic "high" state, determines that AC adaptor 80 is connected in step S12 of FIG. 3. In this state, the DC-DC converter 90 drops and stabilizes the external DC voltage input via the diode 91 and supplies it as an operation voltage to the system load 50.

Meanwhile, the charging/discharging control unit 60, which detects that the AC adaptor 80 is connected, enables the charging mode signal (ICMOD) to be logic "low" in step S14 to block a discharging path of the first and second battery packs 20a and 20b, and then, reads CEWD information from the first and second battery packs 20a and 20b via the SM bus. At this time, the CEWD information means an identification number of a battery pack, a charging capacity per cell, charging current per cell, the number of cells, total charging current, a used capacity, a remaining capacity and the like. The CEWD information is widely provided by the smart battery. Of course, when the CEWD information of a battery pack is output, the identification number of the corresponding battery pack is attached to a header and transmitted so that the battery pack is identified.

After reading the CEWD information from the first and second battery packs 20a and 20b via the SM bus in step S14, the charging/discharging control unit 60 analyzes the read CEWD information to determine whether all the battery packs are fully charged in step S16. When it is determined in step S16 that all the battery packs are fully charged, the charge control unit 60 blocks the charging control signal CCS and thus the output of the charging voltage generator 30, thus causing the first and second battery packs 20a and 20b not to be charged.

However, when it is determined in step S16 that all the battery packs are not fully charged, the charge control unit 60 sets up the charging order in step S18 on the basis of the size of the charging current contained in the CEWD information which is read from the first and second battery packs 20a and 20b.

For example, if both the first and second battery packs 20a and 20b are not fully charged and the charging current of the first battery pack 20a is higher than that of the second battery pack 20b, the charge control unit 60 sets up the charging order in step S18 so that the first battery pack 20a is charged earlier than the second battery pack 20b. The charging/discharging control unit 60 then outputs the selection signal SEL in a logic "high" state while maintaining the logic "low" state of the charging mode signal (ICMOD), and outputs the charging control signal CCS for generating the charging voltage CV corresponding to the charging current of the first battery pack 20a, in step S20 of FIG. 3. That is, assuming that the total charging current of the first battery pack 20a is 600 mA, the charging/discharging control unit 60 outputs the charging control signal CCS for generating a charging voltage CV with a current of 600 mA.

The charging voltage generator 30 shown in FIG. 2 generates the charging voltage CV with a current corresponding to the charging control signal CCS from the charging/discharging control unit 60. The charging voltage CV output from the charging voltage generator 30 is supplied to the voltage terminal of the first battery pack 20a via the first analog switch 72, which is turned on by the selection signal in a logic "high" state. At this time, the second analog switch 74 maintains a state turned off by the selection signal SEL in a logic "high" state, so that only the first battery pack 20a is charged by the charging voltage CV output from the charging voltage generator 30.

The charging/discharging control unit 60 that performs step S20 reads the CEWD information from the first battery pack 20a via the SM bus to determine whether the battery pack is fully charged, in step S22. Steps S20 and S22 are repeatedly performed until the battery pack is fully charged, thus causing the battery pack to be lastingly charged.

If it is determined in step S22 that the first battery pack 20a is fully charged, steps S16, S18 and S20 are performed, so that the selection signal SEL is output in a logic "low" state to charge the second battery pack 20b and the charging control signal CCS is output in order to generate the charging voltage CV with the current-voltage corresponding to the charging current of the second battery pack 20b. That is, assuming that the total charging current of the first battery pack 20b is 300 mA, the charging/discharging control unit 60 outputs the charging control signal CCS for generating the charging voltage CV with a current of 300 mA, in step S20.

At this time, the first analog switch 72 is turned off and the second analog switch 74 is turned on, whereby a charging path is set up so that the charging voltage CV output from the charging voltage generator 30 is supplied to the voltage terminal of the second battery pack 20b through the charging path. Further, the charging voltage generator 30 generates the charging voltage CV with the current-voltage corresponding to a charging current in response to the charging control signal CCS output from the charging/discharging control unit 60, whereby the second battery pack 20b is charged with the current-voltage adjusted to the charging current.

When the first and second battery packs 20a and 20b are fully charged according to the aforementioned operation and the CEWD information of the battery pack indicates a fully charged state, the charging/discharging control unit 60, which reads the CEWD information from the first and second battery packs 20a and 20b via the SM bus, determines that all the battery packs are fully charged and disables the charging control signal CCS to cause the charging voltage CV output from the charging voltage generator 30 to be 0V.

If the charging operation of the battery pack stops, the system load 50 of the portable device 10 of FIG. 2 is driven by the DC power supplied from the DC-DC converter 90, which drops and stabilizes the output of the AC adaptor 80 for converting AC power to DC power.

Although it is described in the embodiment of the present invention that the charging current of the first battery pack 20a is larger than that of the second battery pack 20b, when the charging current of the first battery pack 20a is smaller than that of the second battery pack 20b, the second battery pack 20b is preferentially charged and the first battery pack 20a is then charged, thereby achieving the same effect.

Discharging Mode of Battery Pack

When a user intends to use the portable device 10 in a place where there is no AC power source, the AC adaptor 80 is not connected to the external voltage input terminal EVIP. At this time, the EVD 40 detects that there is no DC power on the external voltage input terminal EVIP, so that an external voltage detection signal EVDS connected to the charging/discharging control unit 60 is output in a logic "low" state.

When the user turns on the portable device 10 by operating the power switch, the charging/discharging control unit 60 outputs, by default, a selection signal SEL in a logic "low" state and a charging mode signal (ICMOD) in a logic "high" state to turn on the first analog switch 72 and the third analog switch 74. The DC-DC converter 90 drops and stabilizes the voltage from the first battery pack 20a to drive the system load 50.

The charging/discharging control unit 60 detects the output level of the EVD 40 to determine whether the AC adaptor 80 is connected, in step S12 of FIG. 3. When the AC adaptor 80 is not connected, the output of the EVD 40 is in a logic "low" state. Thus, the charging/discharging control unit 60 determines that the AC adaptor 80 is not connected based on the output of EVD 40, and reads the CEWD information from the first and second battery packs 20a and 20b via the SM bus, in step S24 of FIG. 3.

It is determined in step S26 of FIG. 3 whether all the battery packs are fully discharged based on the CEWD information read from the first and second battery packs 20a and 20b. When it is determined that the first and second battery packs 20a and 20b are not fully discharged, the charging/discharging control unit 60 analyzes a total charging current contained in the CEWD information from the two battery packs and sets up the discharging order so that a voltage of the battery pack having a higher charging current is preferentially discharged, in step S28.

For example, when the charging current of the first battery pack 20a is 600 mA and the charging current of the second battery pack 20b is 300 mA, the charging/discharging control unit 60 sets up the discharging order so that the first battery pack 20a is discharged earlier than the second battery pack 20b, in step S28 of FIG. 3.

The charging/discharging control unit 60 then outputs the selection signal SEL for the battery pack corresponding to the set discharging order, in step S30. For example, when the discharging priority of the first battery pack 20a is set higher than that of the second battery pack 20b, the charging/discharging control unit 60 outputs the selection signal SEL in a logic "high" state. In response to the selection signal SEL in a logic "high" state, the first analog switch 72 is turned on thus to set up a discharging path of the first battery pack 20a, and the second analog switch 74 is turned off thus to break a discharging path of the second battery pack 20b.

According to this operation, the charging voltage of the first battery pack 20a having a relatively higher charging current is applied to the DC-DC converter 90 and the voltage of the first battery pack 20a is applied to the system load 50, thus driving the portable device 10.

When the first battery pack 20a is discharged via the set discharging path, the charging/discharging control unit 60 repeatedly perform step S26, whereby the portable device 10 is driven by supplying the voltage of the first battery pack 20a thereto through the DC-DC converter 90 until the charging voltage of the first battery pack 20a is sufficiently discharged.

According to this operation, when the first battery pack 20a is sufficiently discharged and the remaining capacity information in CEWD information of the first battery pack 20a indicates a discharged state, the charging/discharging control unit 60 outputs the selection signal SEL based on the discharging order set in step S28. In the embodiment of the present invention, since only the two battery packs are shown, the selection signal SEL is output in a logic "low" state.

In response to the selection signal SEL output in a logic "low" state from the charging/discharging control unit 60, the first analog switch 72 is turned off and the second analog switch 74 is turned on, so that the charging voltage of the second battery pack 20b is input to the DC-DC converter 90 via the second analog switch 74 and the third analog switch 78. At this time, the switching from the first battery pack 20a to the second battery pack 20b is made within several tens of nanoseconds. A capacitor having relatively large capacity is connected in parallel to the output terminal of the DC-DC converter 90, so that there is no substantial change in the voltage supplied from the DC-DC converter 90 to the system load 50.

Comparison of Charge and Discharge Effects

According to the preferred embodiment of the present invention, in the portable device 10 that detects the charging current of the battery packs and preferentially discharges and charges a battery pack having a higher charging current, the battery pack having a higher charging current is preferentially charged with the charging current corresponding to a used capacity of the corresponding battery pack, thereby greatly shortening the charging time.

For example, as shown in the table of FIG. 4, assuming that the first battery pack (basic battery pack) 20a and the second battery pack (optional battery pack) 20b respectively consist of six cells and three cells and each cell of both the battery packs 20a and 20b has a capacity of 2000 mA and a charging current of 100 mA, it can be seen that the total charging current of the basic battery pack is 600 mA and the total charging current of the optional battery pack is 300 mA. Here, it is assumed that, in the portable device 10 including the two battery packs 20a and 20b electrically connected thereto, total 3000 mA is discharged from a state where the cells of the two battery packs 20a and 20b are fully charged.

According to the conventional method for managing power of battery packs, the second battery pack 20b that is an optional battery would be discharged. Accordingly, the second battery pack 20b would have a remaining capacity of 50% and the first battery pack 20a as a basic battery pack would have a remaining capacity of 100%. When charging is initiated in such a discharged state, the charging unit of the portable device generates a charging voltage with a charging current of 300 mA to charge the second battery pack 20b. This implies that the battery pack is charged in proportion to a used capacity relative to a total capacity of the second battery pack 20b, i.e., a use ratio.

However, if the battery packs are discharged using the apparatus and method for managing power of battery packs according to the embodiment of the present invention, the first battery pack 20a has a remaining capacity of 75% and the second battery pack 20b has a remaining capacity of 100%. When the charging is initiated in such a discharged state, the charging voltage generator 30 of the portable device 10 generates the charging voltage CV with a charging current of 600 mA in response to the charging control signal CCS output from the charging/discharging control unit 60 to charge the first battery pack 20a. This implies that the charging operation is performed in proportion to a used capacity relative to a total capacity of the first battery pack 20a, i.e., a use ratio.

With the device and method for managing power of battery packs according to the embodiment of the present invention, the battery pack with higher charging current is preferentially discharged and charged, thereby greatly shortening the charging time when the two batteries are partially discharged.

Although it is described in the embodiment of the present invention that the SM bus is used for data communication between the first and second battery packs 20a and 20b and the charging/discharging control unit 60, a serial communication bus such as an inter-integrated circuits bus (I²C) may be used.

As described above, with an apparatus and method for managing power of dual battery packs in a portable device according to the embodiment of the present invention, after detecting charging current of battery packs having different charging capacities, the battery pack with higher charging current is preferentially discharged and charged, thereby greatly shortening the charging time in the portable device charging battery packs in proportion to a battery use ratio.

Although the present invention has been described with reference to certain exemplary embodiment thereof, it will be understood by those skilled in the art that various changes in form and details may be made therein without departing from the spirit and scope of the invention as defined by the appended claims. For example, the present invention may be applied to a variety of electronic devices of a dual battery type, such as codeless devices including wireless mobile terminals, codeless telephones, an electronic pocket books and video cameras. That is, the present invention is not limited to the illustrated configurations. Appended claims should be referred to in order to understand the subject matter of the present invention.

What is claimed is:

1. An apparatus for managing power in a portable device, comprising:
    a control module configured to:
        determine a remaining capacity and a charging current from each of a first battery pack and a second battery pack coupled to a portable device,
        determine an order for charging and discharging the first and second battery packs based on the charging currents,
        output a battery selection signal that selects one of the first battery pack and the second battery pack based on the determined order,
        output a charge mode signal indicating one of a charging mode and a discharging mode based on a presence of an external voltage, and
        generate a charging control signal corresponding to the remaining capacity and the charging current of the selected battery pack;
    a charging voltage module configured to convert, based on the charging control signal, the external voltage into a charging voltage with a current capacity; and
    a path setting module coupled to the charging voltage module, the first and second battery packs, and a system load in the portable device, the path setting module configured to supply the charging voltage from the charging voltage module to the selected battery pack or supply output voltage from the selected battery pack to the system load according to the charge mode signal and the battery selection signal.

2. The apparatus of claim 1, wherein the determined order indicates charging and discharging of the first battery pack prior to the second battery pack when the charging current of the first battery pack exceeds the charging current of the second battery pack.

3. The apparatus of claim 2, wherein the path setting module is configured to supply output voltage from the first battery pack to the system load until a predetermined remaining capacity of the first battery pack is detected by the control module and to subsequently supply output voltage from the second battery pack to the system load.

4. The apparatus of claim 1, wherein each of the first and second battery packs includes cells charged and discharged and a cell watchdog (CEWD) for detecting the remaining capacity and charging current of the cells and outputting the remaining capacity and the charging current in response to a battery state information request signal.

5. The apparatus of claim 1, further comprising an external voltage detector configured to detect external voltage output from an AC adaptor, the external voltage detector interposed between an external voltage input terminal of the charging voltage module and an external voltage detection terminal of the control module.

6. The apparatus of claim 1, wherein the path setting module comprises:
    first and second analog switches respectively coupled between an output terminal of the charging voltage module and output terminals of the first and second battery packs and independently activated according to the battery selection signal; and
    a third analog switch coupled between a common connection node of the first and second analog switches and the system load and activated according to the charge mode signal.

7. The apparatus of claim 6, further comprising a voltage path controller configured to supply the external voltage to the system load in a one-way direction, the voltage path controller being interposed between an external voltage input terminal of the charging voltage module and an output node of the third analog switch.

8. The apparatus of claim 7, wherein the voltage path controller comprises a diode.

9. The apparatus of claim 7, further comprising:
    a DC-DC converter for dropping and stabilizing the external voltage, or a DC voltage supplied from the first and second battery packs, to a resultant voltage level suitable for driving the system load and distributing the resultant voltage to respective parts of the system load, the DC-DC converter being interposed between the voltage path controller and a voltage input terminal of the system load of the portable device.

10. The apparatus of claim 1, further comprising a DC-DC converter for dropping and stabilizing the external voltage, or a DC voltage supplied from the first and second battery packs, to a resultant voltage level suitable for driving the system load and distributing the resultant voltage to respective parts of the system load.

11. The apparatus of claim 10, further comprising:
a capacitor connected in parallel to an output terminal of the DC-DC converter.

12. A method for managing power, comprising:
detecting remaining capacities and charging currents of battery packs electrically coupled to a computing device;
determining an order for charging and discharging the battery packs based on the detected remaining capacities and charging currents;
when an external voltage is supplied to the computing device, charging the battery packs in the determined order using charging voltages with currents corresponding to the detected charging currents; and
when the external voltage is not supplied to the computing device, discharging the battery packs by supplying output voltages from the battery packs to a system load in the determined order based on detected remaining capacities.

13. The method of claim 12, wherein determining an order comprises determining the order for charging and discharging by comparing levels of the detected charging currents.

14. The method of claim 13, wherein determining an order comprises determining to charge or discharge a first battery pack prior to a second battery pack when the detected charging current of the first battery pack exceeds the detected charging current of the second battery pack.

15. The method of claim 14, wherein discharging the battery packs comprises discharging the first battery pack until a predetermined remaining capacity of the first battery pack is detected and subsequently discharging the second battery pack.

16. A method for managing power of at least two smart battery packs, each of the battery packs having cells charged and discharged and each of the battery packs storing battery state information indicating at least a charging current of the cells and a remaining capacity of the cells, the method comprising:
detecting the charging current of each battery pack through data communication with the battery packs;
ordering the battery packs from higher charging current to lower charging current; and
charging or discharging the battery packs according to the ordering and the battery state information, based on whether an external voltage is detected.

17. The method of claim 16, wherein charging or discharging comprises charging the battery packs when the external voltage is detected.

18. The method of claim 17, wherein charging the battery packs comprises supplying charging voltages to the battery packs according to the order, the charging voltages having currents corresponding to the detected charging currents.

19. The method of claim 16, wherein charging or discharging comprises discharging a first battery pack until a predetermined remaining capacity of the first battery pack is detected and subsequently discharging a second battery pack according to the ordering.

20. A battery management module, comprising:
means for detecting charging currents of battery packs electrically coupled to a computing device;
means for determining an order for charging and discharging the battery packs based on the detected charging currents;
means for setting one of a charging mode and a discharging mode based on whether an external voltage is detected;
means for supplying charging voltages to the battery packs in the charging mode according to the determined order, each charging voltage having a current capacity corresponding to the detected charging current of the battery pack to which the charging voltage is supplied; and
means for supplying output voltages from the battery packs to a system load in the discharging mode according to the determined order.

* * * * *